US011912604B2

(12) United States Patent
Gaikwad et al.

(10) Patent No.: US 11,912,604 B2
(45) Date of Patent: Feb. 27, 2024

(54) METHOD FOR FABRICATION OF GLASS PREFORM

(71) Applicant: Sterlite Technologies Limited, Aurangabad (IN)

(72) Inventors: Sandeep Gaikwad, Aurangabad (IN); Badri Gomatam, Aurangabad (IN); Anand Pandey, Aurangabad (IN)

( * ) Notice: Subject to any disclaimer, the term of this patent is extended or adjusted under 35 U.S.C. 154(b) by 0 days.

(21) Appl. No.: 16/993,182

(22) Filed: Aug. 13, 2020

(65) Prior Publication Data

US 2021/0047223 A1  Feb. 18, 2021

(30) Foreign Application Priority Data

Aug. 13, 2019 (IN) .............................. 201921032707

(51) Int. Cl.
| | | |
|---|---|---|
| *C03B 19/06* | (2006.01) | |
| *C01B 33/12* | (2006.01) | |
| *C03C 3/06* | (2006.01) | |
| *C01B 33/18* | (2006.01) | |

(52) U.S. Cl.
CPC ............ *C03B 19/066* (2013.01); *C01B 33/12* (2013.01); *C01B 33/183* (2013.01); *C03B 19/063* (2013.01); *C03C 3/06* (2013.01); *C03B 2201/03* (2013.01); *C03C 2201/02* (2013.01)

(58) Field of Classification Search
None
See application file for complete search history.

(56) References Cited

U.S. PATENT DOCUMENTS

| | | | | |
|---|---|---|---|---|
| 3,423,324 | A * | 1/1969 | Best ..................... | C01B 13/22 |
| | | | | 252/301.4 F |
| 5,785,941 | A * | 7/1998 | Maginot .............. | C01B 33/183 |
| | | | | 423/337 |
| 2008/0203625 | A1* | 8/2008 | Oswald ................ | C03B 32/005 |
| | | | | 264/604 |
| 2019/0186356 | A1* | 6/2019 | Bookbinder ......... | F16L 59/028 |

* cited by examiner

*Primary Examiner* — Queenie S Dehghan
(74) *Attorney, Agent, or Firm* — Steven R. Fairchild; Michael J. Pennington

(57) ABSTRACT

The present disclosure provides a method for fabrication of a glass preform. The method includes production of soot particles in a combustion chamber using a precursor material. The heating of the precursor material produces the soot particles along with one or more impurities. In addition, the method includes agglomeration of the soot particles. Further, the method includes separation of the soot particles from the one or more impurities. Also, the separation of the soot particles is performed in a cyclone separator. Furthermore, the method includes collection of the soot particles. Also, the soot particles are compacted with facilitation of a preform compaction chamber. Also, the compacted preform is sintered with facilitation of a sintering furnace. The compaction of the soot particles followed by sintering results in formation of the glass preform.

7 Claims, 3 Drawing Sheets

METHOD FOR FABRICATION OF GLASS PREFORM

BACKGROUND OF THE INVENTION

Field of the Invention

The present disclosure relates to the field of optical fibre. More particularly, the present disclosure relates to a method for fabrication of a glass preform. This application is based on, and claims priority from an Indian Application Number 201921032707 filed on 13 Aug. 2019.

Description of the Related Art

Over the last few years, optical fibers are widely used for network communication due to enormous benefits over metal wires. The increasing demand of the optical fibers leads to mass production of optical fibre preform. Conventionally, the optical fibre preform are manufactured using various methods. The various methods include but may not be limited to outside vapor deposition (OVD) and vapor axial deposition (VAD). The basic process involved in the OVD is called "flame hydrolysis". In this process, $SiCl_4$ reacts with oxygen (O) and hydrogen (H2) to produce silica ($SiO_2$), hydrogen chloride (HCl), and water vapor ($H_2O$). In addition, the OVD process is a limiting process with complex machine designs for fabrication of the optical fibre preform in bulk. Furthermore, fabrication of the optical fibre preform using the OVD process leads to reduced materials efficiency. Due to reduced materials efficiency the running cost is high and also consumes time.

In light of the above stated discussion, there is a need for an improved method for fabrication of a glass preform.

BRIEF SUMMARY OF THE INVENTION

In an aspect, the present disclosure provides a method for fabrication of a glass preform. The method includes production of soot particles in a combustion chamber using a precursor material. The soot particles are silica particles. In addition, the method includes agglomeration of the soot particles. Further, the method includes separation of the soot particles from the one or more impurities. Furthermore, the method includes collection of the soot particles. Moreover, the method includes compaction of the soot particles. Also, the soot particles are produced by heating the precursor material with facilitation of a plurality of burners. The heating of the precursor material produces the soot particles along with one or more impurities. Also, the agglomeration is performed using a plurality of agglomerator tubes. The soot particles are agglomerated based on size of the plurality of agglomerator tubes. Also, the separation of the soot particles is performed in a cyclone separator. Also, the collection of the soot particles is performed in a soot collection chamber. Also, the soot particles are compacted with facilitation of a preform compaction chamber. The compaction followed by sintering of the compacted soot particles results in formation of the glass preform.

In an embodiment of the present disclosure, the combustion chamber includes the plurality of burners and an inlet. The combustion chamber is filled with a purging gas. The inlet is used for insertion of purging gas in the combustion chamber. The gases in the combustion chamber for generation of heat may be hydrogen (H2) and oxygen (O) or CH4 and Oxygen (O).

In an embodiment of the present disclosure, the combustion chamber is made of hastelloy material.

In an embodiment of the present disclosure, the one or more impurities include HCl and water vapors.

In an embodiment of the present disclosure, the precursor material is at least one of silicon tetrachloride ($SiCl_4$) or octamethylcyclotetrasiloxane (OMCTS or D4).

In an embodiment of the present disclosure, the plurality of agglomerator tubes is surrounded by a cooling layer. The cooling layer facilitates cooling of the soot particles inside the plurality of agglomerator tubes.

In an embodiment of the present disclosure, the cyclone separator facilitates separation of the soot particles from the one or more impure gases.

In an embodiment of the present disclosure, the compaction of the soot particles is performed using at least one of uniaxial compaction process, cold isostatic compaction process and hot isostatic compaction process.

In an embodiment of the present disclosure, the compaction of the soot particles is performed with continuous facilitation of a dehydration gas. The dehydration gas is at least one of chlorine. The dehydration gas removes an OH ion concentration from a soot preform.

In an embodiment of the present disclosure, the compaction of the soot particles in the preform compaction chamber. In addition, the multiple dopants can be added to the silicon dioxide particles before compaction and multiple layer of dopants can be compacted with facilitation of combination of uniaxial compaction process, isostatic compaction process, and hot isostatic compaction process.

The sintering of the compacted soot particles will be performed to form the glass preform. The glass preform produced is of high efficiency.

BRIEF DESCRIPTION OF THE DRAWINGS

In order to best describe the manner in which the above-described embodiments are implemented, as well as define other advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings in which.

Figure 1:
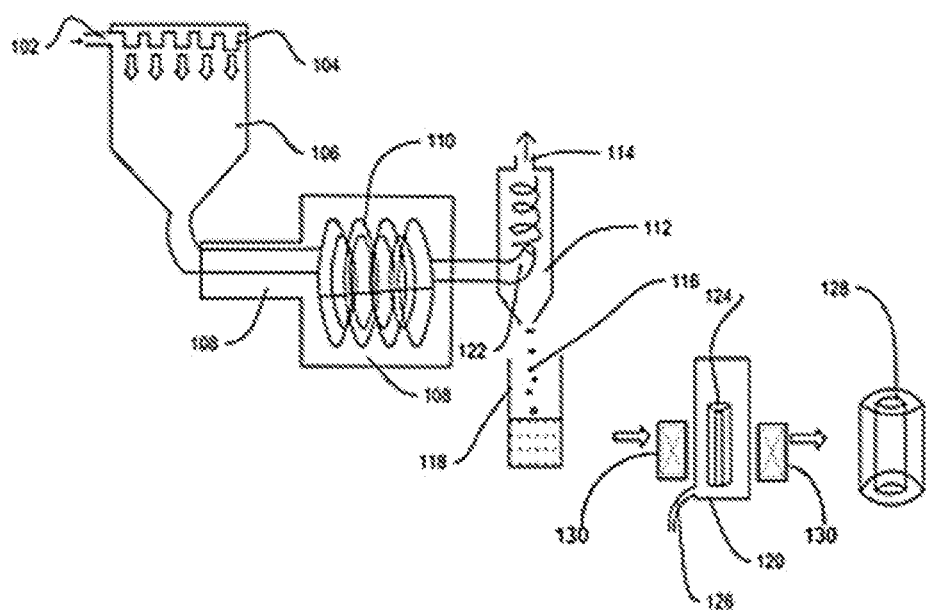
FIG. 1 illustrates a system for fabrication of a glass preform, in accordance with an embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a system 100 for fabrication of a glass preform 128, in accordance with an embodiment of the present disclosure. FIG. 1 shows an arrangement of various components of the system 100. The system 100 enables a process for fabrication of the glass preform 128. In general, glass preform is large glass body being used to draw optical fibres. In addition, it is to be understood that, glass body may be a hollow cylindrical glass body, transparent glass body, solid glass body or colored glass body. In addition, glass preform is fabricated by using one or more manufacturing techniques. Further, one or more manufacturing techniques include but may not be limited to outside vapor deposition and vapor axial deposition.

The system 100 includes a combustion chamber 106, a plurality of agglomerator tubes 110, a cooling layer 108, a cyclone separator 112, a soot collection chamber 118, a preform compaction chamber 120 and sintering furnace 130.

The system 100 includes the combustion chamber 106. In addition, the combustion chamber 106 is made of hastelloy material. In general, hastelloy material is superalloy made up of nickel-molybdenum-chromium. In addition, hastelloy provides high-corrosion resistance from environment. Further, the hastelloy material is used to bear high temperature. In general, combustion chamber is enclosed space that enables combustion. The combustion chamber 106 includes an inlet 102 and a plurality of burners 104. In general, the gases in the combustion chamber for generation of heat may be Hydrogen (H2) or Oxygen (O) or CH4 and Oxygen (O). In an embodiment of the present disclosure, the combustion chamber 106 is filled with a purging gas through the inlet 102. In addition, the purging gas is used to maintain the temperature inside the combustion chamber. 106. In an example, purging gas is nitrogen. In yet another example, the purging gas is any suitable gas of the like.

In an embodiment of the present disclosure, the combustion chamber 106 is utilized to produce soot particles 116 using a precursor material. In general, soot corresponds to powdery or flaky substance consisting of silica. The soot particles 116 are produced by heating the precursor material with facilitation of the plurality of burners 104. In general, the primary size of the generated particles is 0.1 micron. The primary level of agglomeration happens along the combustible gas flame as well. In addition, the heating of the precursor material produces the soot particles 116 along with one or more impurities. Further, the one or more impurities are HCl and water vapors if precursor is SiCl4. In general, precursor material is compound that participates in chemical reaction to produce another compound. In addition, precursor material is raw material used to manufacture silica soot particles.

In an embodiment of the present disclosure, the precursor material is at least one of silicon tetrachloride (SiCl4) or octamethylcyclotetrasiloxane (OMCTS or D4). In general, octamethylcyclotetrasiloxane is organosilicon compound with chemical formula [(CH3)2SiO]4. In addition, octamethylcyclotetrasiloxane is colorless viscous liquid. In another embodiment of the present disclosure, the precursor material may vary.

The system 100 includes the plurality of agglomerator tubes 110. In addition, the plurality of agglomerator tubes 110 is surrounded by the cooling layer 108. Further, the cooling layer 108 reduces overall temperature of the soot particles 116 along with the one or more impurities. In an embodiment of the present disclosure, the soot particles 116 along with the one or more impurities undergo agglomeration inside the plurality of agglomerator tubes 110. In addition, the soot particles 116 are agglomerated inside the plurality of agglomerator tubes 110 with facilitation of the cooling layer 108. In general, agglomeration is process of collecting in mass and refers to sticking of soot particles to one another. In an embodiment of the present disclosure, the soot particles 116 are agglomerated is of uniform and desired size. In an embodiment of the present disclosure, the agglomerated tubes 110 and cooling layers 108 may kept as nonfunctional based on the particle size requirement. In an embodiment of the present disclosure, the agglomeration of the silicon dioxide particles 108 is performed for the range of 1 to 100 micron silicon dioxide particles diameter. In an embodiment of the present disclosure, the agglomeration of the silicon dioxide particles 108 is performed for the average silicon dioxide particles sizes in the range of 10 to 40 micron diameter. The average silicon dioxide particles sizes decides the collection efficiency of the cyclone separator.

The system 100 includes the cyclone separator 112. The cyclone separator 112 includes a first inlet 122 and an outlet 114. In an embodiment of the present disclosure, the soot particles 116 along with the one or more impurities are released inside the cyclone separator 112 through the first inlet 122. In general, cyclone separator uses centrifugal force that produces particles in swirl flow and separates out particles due to gravity force. In an embodiment of the present disclosure, the cyclone separator 112 facilitates separation of the soot particles 116 from the one or more impurities. In an embodiment of the present disclosure, the one or more impurities passes out of the cyclone separator 112 through the outlet 114. In addition, the soot particles 116 are collected in the soot collection chamber 118. Further, the soot particles 116 are in powdered form. In an embodiment of the present disclosure, the cyclone separator 114 receives the particle sizes in the range of 10 micron to 40 micron in diameter and separates these silicon dioxide particles 108 from the waste particulates. In an embodiment of the present disclosure, the cyclone separator 114 also separates the particles sizes more than 40 micron in diameter from the waste particulates. The soot particles 116 are collected in the soot collection chamber 118 (as shown in FIG. 1).

The system 100 includes the preform compaction chamber 120. In general, the end loss of soot making process which typically contribute 20%-30% depend on size of soot. This compaction system can reduce end loss by more than 50%. In an embodiment of the present disclosure, the preform compaction chamber 120 is utilized to perform compaction of the silicon dioxide particles 108 with very low curvature surfaces at both end to represent the cone which can reduce end loss by more than 50% compared to conventional optical fibre manufacturing process. In an embodiment of the present disclosure, the preform compaction chamber 120 is utilized to perform compaction of the silicon dioxide particles 108 to provide cone free preform. In addition, the preform compaction chamber 120 is used to maintain high temperature. Further, the preform compaction chamber is connected to a dehydration gas inlet 126. In an embodiment of the present disclosure, the preform compaction chamber 120 facilitates compaction of the soot particles 116. In addition, the compaction of the soot particles 116 is performed with continuous facilitation of a dehydration gas through the dehydration gas inlet 126. Further, dehydration of the soot particles 116 is done at high temperature maintained by the preform compaction chamber 120. Furthermore, the dehydration gas released inside the preform compaction chamber 120 includes but may not be limited to chlorine. Moreover, the dehydration gas removes an OH ion concentration of the soot particles 116. In addition, the required temperature maintained for the dehydration may not be limited to 1050° Celsius to 1150° Celsius. In an embodiment of the present disclosure, the preform compaction chamber 120 provides compaction of soot preform length in the range of 0.5 m to 2 m and final compaction preform diameter in the range of 0.05 m to 0.35 m. The chamber provides preform compaction length is not limited to aforementioned range of length 0.5 m to 2 m and diameter range of the compacted preform is 0.05 m to 0.35 m. In an embodiment of the present disclosure, the preform compaction chamber 120 has capability for sintering the compacted soot particles through sintering furnace 130. In an embodiment of the present disclosure, after the sintering of the dehydrated compacted soot particles, desired size and shape of the glass preform is achieved within acceptable range of preform diameter variations. The preform compaction process corresponds to the pressing of the silica particles in the presence of binders. The binders may be selected from but not limited to Poly propylene carbonate, Polyvinyl alcohol, Poly Styrene, Camphor, and Gelatin based Agar. The concentration of the binders lies in the range of about 100 ppm to 10,000 ppm. In an example of the present disclosure the concentration of the binders may be of any other suitable range.

In an embodiment of the present disclosure, the compaction of the soot particles 116 results in generation of a soot preform 124. In an embodiment of the present disclosure, the compaction of the soot particles 116 is performed using at least one of uniaxial compaction process, cold isostatic compaction process and hot isostatic compaction process. In an embodiment of the present disclosure, the preform compaction chamber 120 is utilized to perform compaction of the silicon dioxide particles with the different dopants. In an embodiment of the present disclosure, the preform compaction chamber 120 is utilized to perform compaction of the silicon dioxide particles with multiple layer of dopant with same or different precursors. In an embodiment of the present disclosure, the preform compaction chamber 120 has capability for sintering the compacted soot particles through sintering furnace 130.

In an embodiment of the present disclosure, the soot particles 116 are compacted with facilitation of hot uniaxial compaction process. In another embodiment of the present disclosure, the soot particles 116 are compacted with facilitation of hot isostatic compaction process. In yet another embodiment of the present disclosure, the soot particles 116 are compacted with facilitation of hot uniaxial compaction process and hot isostatic compaction process. In yet another embodiment of the present disclosure, the compaction process of the soot particles 116 may vary. In general, hot uniaxial compaction is process of compacting particles by applying pressure in one direction. In general, hot isostatic compaction is process of compacting particles by applying pressure in all direction. In addition, hot isostatic compaction increases density of particles. In general, hot uniaxial compaction and hot isostatic compaction provides densification in combine effect of high pressure and high temperature. In an embodiment of the present disclosure, the soot preform 124 is heat up in the preform compaction chamber 120 at required temperature. In addition, the required temperature maintained by the preform compaction chamber 120 may not be limited to 1000° Celsius to 1200° Celsius for compaction of soot particles. In an embodiment of the present disclosure, the preform compaction chamber 120 has capability for sintering the compacted soot particles through sintering furnace 130. In an embodiment of the present disclosure, the soot preform 124 sintered by sintered furnace 130 at high temperature results in formation of the glass preform 128. In addition, the required temperature maintained by the sintering furnace 130 may not be limited to 1500° Celsius to 1600° Celsius for sintering of the compacted soot particles.

Figure 2:
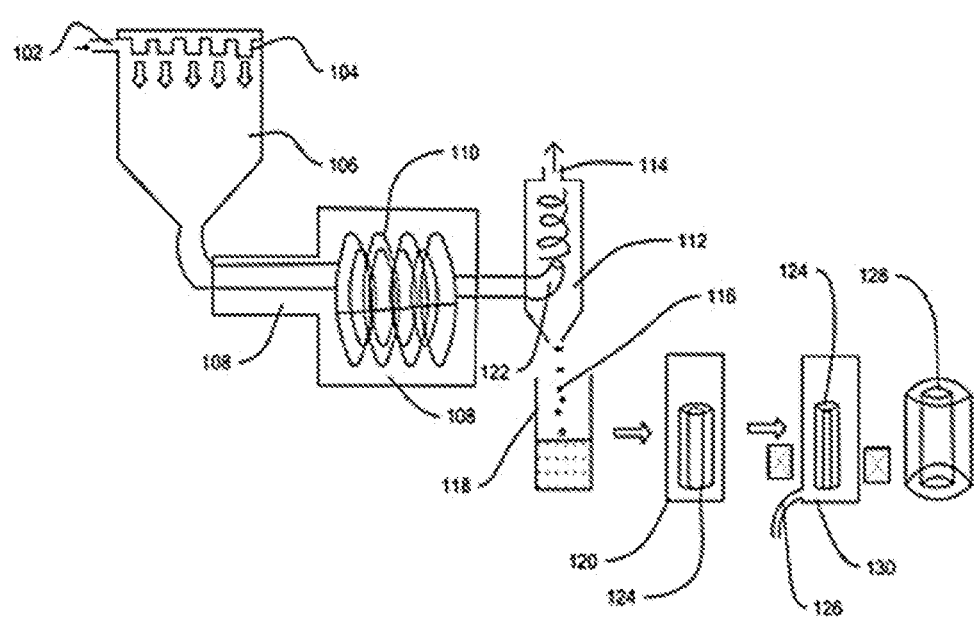
FIG. 2 illustrates the system for fabrication of the glass preform, in accordance with another embodiment of the present disclosure.

FIG. 2 illustrates the system 100 for fabrication of the glass preform 122, in accordance with another embodiment of the present disclosure. FIG. 2 shows an arrangement of components of the system 100. The components of FIG. 2 are similar to the various components of FIG. 1. The system 100 includes the combustion chamber 106, the plurality of agglomerator tubes 110, the cooling layer 108, the cyclone separator 112, the soot collection chamber 118 and the preform compaction chamber 120. In addition, the system 100 includes a controlled atmospheric furnace 130 (as shown in FIG. 2).

The soot particles 116 are filled inside the preform compaction chamber 120. Further, the soot particles 116 undergo compaction with facilitation of the preform compaction chamber 120. In an embodiment of the present disclosure, the soot particles 116 are compacted using cold uniaxial compaction process. In another embodiment of the present disclosure, the soot particles 116 are compacted using cold isostatic compaction process. In yet another embodiment of the present disclosure, the soot particles 116 are compacted using the cold uniaxial compaction process and the cold isostatic compaction process. In yet another embodiment of the present disclosure, the compaction process of the soot particles 116 may vary. In an embodiment of the present disclosure, the compaction of the soot particles 116 results in formation of the soot preform 124.

The soot preform 124 is placed inside the controlled atmospheric furnace 130. In an embodiment of the present disclosure, the controlled atmospheric furnace 130 provides high temperature to the soot preform 124. In addition, the high temperature inside the controlled atmospheric furnace 130 facilitates dehydration of the soot preform 124. Further, the dehydration of the soot preform 124 is done with continuous facilitation of the dehydration gas through the dehydration gas inlet 126. Furthermore, the dehydration gas includes but may not be limited to chlorine. Moreover, the chlorine removes the OH ion concentration from the soot preform 124. In addition, the required temperature maintained for the dehydration may not be limited to 1050° Celsius to 1150° Celsius. In addition, the required temperature maintained by the sintering furnace 130 may not be limited to 1500° Celsius to 1600° Celsius for sintering of the compacted soot particles. In addition, the high temperature inside the controlled atmospheric furnace 130 facilitates sintering of the soot preform 124 to obtain the desired shape and size of the glass preform. In an embodiment of the present disclosure, preform 124 may be further drawn into optical fibre directly or may be a cladding preform further utilized in RIC process. In an embodiment of the present disclosure, the sintering of the compacted soot preform 124 in the controlled atmospheric furnace 130 results in formation of the glass preform 128.

Figure 3:
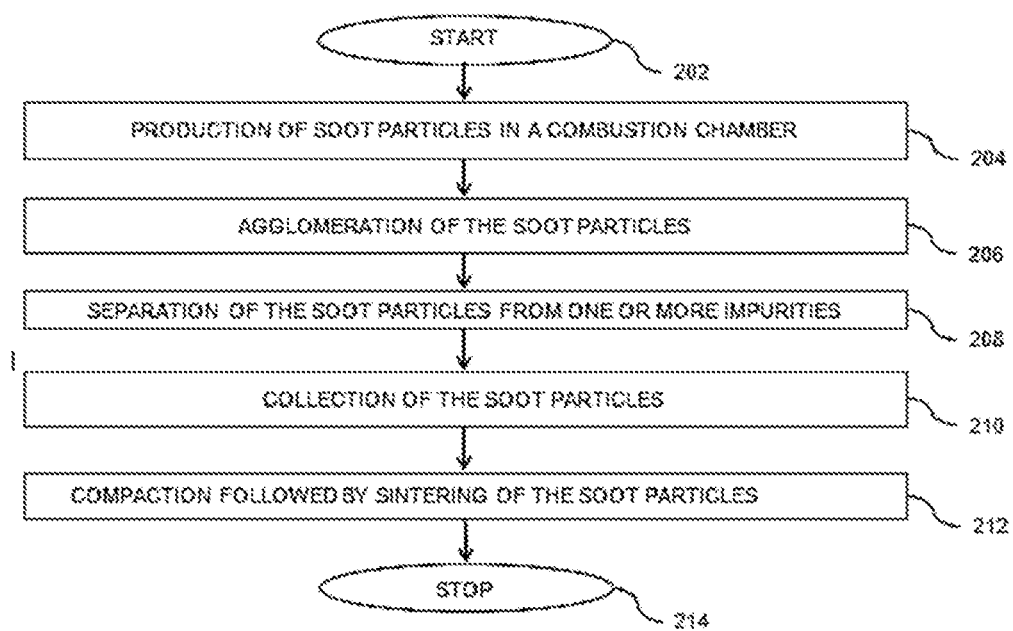
FIG. 3 illustrates a flow chart depicting a method for fabrication of the glass preform, in accordance with various embodiments of the present disclosure.

FIG. 3 illustrates a flow chart 200 depicting a method for fabrication of the glass preform 128, in accordance with various embodiment of the present disclosure. It may be noted that to explain the process steps of the flowchart 200, references will be made to the system components of FIG. 1 and FIG. 2. It may also be noted that the flowchart 200 may have lesser or more number of steps.

The flow chart 200 initiates at step 202. Following step 202, at step 204, the method includes production of the soot particles 116 in the combustion chamber 106. In addition, the combustion chamber 106 is using purging gas. Further, the purging gas is used to maintain the temperature inside the combustion chamber 106. Furthermore, the soot particles 116 are produced by heating the precursor material with facilitation of the plurality of burners 104. Moreover, the heating of the precursor material produces the soot particles 116 along with the one or more impurities. Also, the one or more impurities include HCl and water vapors.

At step 206, the method includes the agglomeration of soot particles 116 performed in the plurality of agglomerator tubes 110. In addition, the soot particles 116 are agglomerated inside the plurality of agglomerator tubes 110 with the facilitation of the cooling layer 108. Further, the cooling layer 108 reduces overall temperature of the soot particles 116. Furthermore, the soot particles 116 are agglomerated is of uniform and desired size. Furthermore, the soot particles 116 along with the one or more impurities are inserted in the cyclone separator 112 through the first inlet 122. Furthermore, the soot particles 116 along with the one or more impurities may be separated by the methods of ESP or Bagfilter. At step 208, the method includes separation of the soot particles 116 from the one or more impurities in the cyclone separator 112. Further, the one or more impurities passes out of the cyclone separator 112 through the outlet 114.

At step 210, the method includes the collection of the soot particles 116 inside the soot collection chamber 118. At step 212, the method includes the compaction of the soot particles 116 inside the preform compaction chamber 120. Further, the soot particles undergo dehydration at the high temperature with continuous facilitation of the dehydration gas. Furthermore, the dehydration gas includes but may not be limited to chlorine. Moreover, the compaction of the soot particles 116 followed by sintering results in formation of the glass preform 128. The flow chart terminates at step 214.

The present disclosure provides numerous advantages over the prior art. The present disclosure provides an improved method for fabrication of the glass preform with high efficiency. In addition, the method used for fabrication of the glass preform is cost effective and requires less overall process time. Further, the method provides ease of operation during fabrication of the glass preform. Furthermore, the method is applicable for fabrication of both core and clad for optical fibres. Moreover, the method is applicable for fabrication of a pure silica core and a pure silica clad.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. A method for fabrication of a glass preform, the method comprising:
   production of soot particles in a combustion chamber using a precursor material, wherein the soot particles are produced by heating the precursor material with facilitation of a plurality of burners, wherein the heating of the precursor material produces the soot particles along with one or more impurities, wherein the combustion chamber comprises the plurality of burners and an inlet, wherein the combustion chamber is filled with a purging gas, wherein the inlet is used for insertion of the purging gas in the combustion chamber, and wherein the combustion chamber is made of hastelloy material;
   agglomeration of the soot particles, wherein the agglomeration is performed inside a plurality of agglomerator tubes;
   separation of the soot particles from the one or more impurities, wherein the separation of the soot particles is performed in a cyclone separator;
   collection of the soot particles, wherein the collection of the soot particles is performed in a soot collection chamber; and compaction of the soot particles, wherein the soot particles are compacted with facilitation of a preform compaction chamber, wherein the compaction of the soot particles is performed with continuous facilitation of a dehydration gas, and wherein the dehydration gas is chlorine;

sintering of the compacted soot particles, wherein the compaction of the soot particles followed by the sintering results in formation of the glass preform.

2. The method as claimed in claim 1, wherein the precursor material is silicon tetrachloride (SiCl4), and wherein the heating of the SiCl4 produces the one or more impurities comprising HCl and water vapors.

3. The method as claimed in claim 1, wherein the precursor material is at least one of silicon tetrachloride (SiCl4) or octamethylcyclotetrasiloxane (OMCTS or D4).

4. The method as claimed in claim 1, wherein the plurality of agglomerator tubes (110) is surrounded by a cooling layer, and wherein the cooling layer facilitates cooling of the soot particles inside the plurality of agglomerator tubes.

5. The method as claimed in claim 1, wherein the compaction of the soot particles is performed using at least one of uniaxial compaction process, cold isostatic compaction process and hot isostatic compaction process.

6. The method as claimed in claim 1, further comprising dehydrating the soot particles in the preform compaction chamber with continuous facilitation of the dehydration gas, wherein the compaction of the soot particles results in generation of a soot preform, and wherein the dehydration gas removes an OH ion concentration from the soot preform.

7. The method as claimed in claim 1, wherein the compaction of the soot particles results in generation of a soot preform, wherein the sintering of the soot preform in a controlled atmospheric furnace leads to the formation of the glass preform, and wherein the soot preform sintered at high temperature in a range of 1500° Celsius to 1600° Celsius results in formation of the glass preform.

\* \* \* \* \*